US012660959B2

(12) United States Patent　　　　(10) Patent No.:　US 12,660,959 B2

Molinaro et al.　　　　　　　　　　　(45) Date of Patent:　Jun. 23, 2026

(54) DEVICE FOR HEATING AND FROTHING MILK

(71) Applicant: LUIGI LAVAZZA S.P.A., Turin (IT)

(72) Inventors: Gabriele Molinaro, Turin (IT);
Gabriele Luciano Picone, Turin (IT);
Jelmer Jeroen Kuiper, Turin (IT);
Thomas Gerard Verloop, Turin (IT)

(73) Assignee: LUIGI LAVAZZA S.P.A., Turin (IT)

( * ) Notice: Subject to any disclaimer, the term of this
patent is extended or adjusted under 35
U.S.C. 154(b) by 762 days.

(21) Appl. No.: 18/026,021

(22) PCT Filed: Sep. 15, 2021

(86) PCT No.: PCT/IB2021/058394
§ 371 (c)(1),
(2) Date: Mar. 13, 2023

(87) PCT Pub. No.: WO2022/058899
PCT Pub. Date: Mar. 24, 2022

(65) Prior Publication Data
US 2023/0363576 A1　　Nov. 16, 2023

(30) Foreign Application Priority Data
Sep. 16, 2020　　(IT) ......................... 102020000021793

(51) Int. Cl.
*A47J 31/44*　　　　(2006.01)
*A47J 31/46*　　　　(2006.01)
*A47J 31/52*　　　　(2006.01)

(52) U.S. Cl.
CPC ......... *A47J 31/4485* (2013.01); *A47J 31/469*
(2018.08); *A47J 31/52* (2013.01)

(58) Field of Classification Search
CPC ...... A47J 31/468; A47J 31/469; A47J 31/461;
A47J 31/4485; A47J 31/52
(Continued)

(56) References Cited

U.S. PATENT DOCUMENTS 3,892,945 A * 7/1975 Lemer ................. A47J 36/2433
422/106
4,583,449 A * 4/1986 Dangel ............... A47J 31/4496
99/302 R
(Continued)

FOREIGN PATENT DOCUMENTS

DE　　　602005004558　　* 3/2008 ......... A47J 31/4485
DE　　60 2005 004 558 T2　 1/2009
(Continued)

OTHER PUBLICATIONS

International Search Report for PCT/IB2021/058394 dated Oct. 15, 2021.

*Primary Examiner* — Jimmy Chou

(74) *Attorney, Agent, or Firm* — Sughrue Mion, PLLC

(57)　　　　　　ABSTRACT

A device for heating and frothing milk which has a steam generator and a jet pump is provided. The jet pump has a steam inlet through which pressurized steam is injectable into the jet pump, a first suction inlet and a second suction inlet. The first suction inlet is configured to connect to a milk reservoir. An air inlet is connectable or connected to the second suction inlet of the jet pump for drawing air into the jet pump. A bypass valve is connected to the second suction inlet of the jet pump and has a bypass inlet. The bypass valve is switchable between a first position in which the second suction inlet of the jet pump is shut off from the steam generator, and a second position in which the second suction inlet is in fluid communication with the bypass inlet of the bypass valve for suction of steam.

10 Claims, 3 Drawing Sheets

(58) Field of Classification Search
USPC .......... 99/275, 281, 293, 300, 305, 309, 318
See application file for complete search history.

(56) References Cited

U.S. PATENT DOCUMENTS

| | | | | |
|---|---|---|---|---|
| 4,821,770 A * | 4/1989 | Parrott | B60T 8/34 | 303/119.2 |
| 4,922,810 A * | 5/1990 | Siccardi | B01F 25/46 | 99/452 |
| 5,135,027 A * | 8/1992 | Miki | F16K 31/0637 | 137/596.17 |
| 5,207,148 A * | 5/1993 | Anderson | A47J 31/525 | 99/290 |
| 5,303,639 A * | 4/1994 | Bunn | A47J 31/54 | 99/289 R |
| 5,357,848 A * | 10/1994 | Eugster | A47J 31/542 | 99/279 |
| 5,498,757 A * | 3/1996 | Johnson | A47J 31/54 | 99/323.1 |
| 5,544,961 A * | 8/1996 | Fuks | B01F 25/31242 | 165/47 |
| 5,611,262 A * | 3/1997 | Rizzuto | A47J 31/4485 | 99/290 |
| 5,842,407 A * | 12/1998 | Schmed | A47J 31/54 | 99/290 |
| 5,937,905 A * | 8/1999 | Santos | E03C 1/0404 | 4/677 |
| 6,019,028 A * | 2/2000 | Schmed | A47J 31/0573 | 99/290 |
| 6,019,032 A * | 2/2000 | Arksey | A47J 31/4485 | 99/452 |
| 6,099,878 A * | 8/2000 | Arksey | A47J 31/4485 | 426/511 |
| 6,845,704 B2 * | 1/2005 | Lassota | A47J 31/402 | 99/280 |
| 6,959,642 B1 * | 11/2005 | Landolt | A47J 31/60 | 99/452 |
| 6,994,231 B2 * | 2/2006 | Jones | B67D 1/0021 | 222/129.1 |
| 7,021,206 B2 * | 4/2006 | Eckenhausen | A47J 31/461 | 99/452 |
| 7,219,597 B2 * | 5/2007 | Eicher | A47J 31/465 | 99/302 R |
| 7,243,818 B2 * | 7/2007 | Jones | B67D 1/0021 | 222/129.1 |
| 7,252,034 B1 * | 8/2007 | Eckenhausen | A47J 31/4485 | 99/323.1 |
| 7,481,151 B2 * | 1/2009 | Van Der Meer | F16K 31/3855 | 99/289 R |
| 7,509,908 B1 * | 3/2009 | Lassota | A47J 31/4475 | 99/305 |
| 7,550,169 B2 * | 6/2009 | Green | A47J 31/4485 | 99/323.1 |
| 7,879,156 B2 * | 2/2011 | Coccia | A47J 31/60 | 99/290 |
| 7,891,287 B2 * | 2/2011 | Miller | A47J 31/106 | 99/302 R |
| 8,056,469 B2 * | 11/2011 | Sala | A47J 31/4485 | 99/290 |
| 8,131,137 B1 * | 3/2012 | Cowles | A47J 36/2433 | 392/394 |
| 8,356,551 B2 * | 1/2013 | Coccia | A47J 31/469 | 99/290 |
| 8,364,030 B2 * | 1/2013 | Reyhanloo | A47J 31/54 | 99/293 |
| 8,383,184 B2 * | 2/2013 | Gugerli | A47J 31/401 | 426/594 |
| 8,511,221 B2 * | 8/2013 | Sala | A47J 31/404 | 126/369.3 |
| 8,631,741 B2 * | 1/2014 | Marquez Gomez | A47J 19/06 | 99/496 |
| 8,646,377 B2 * | 2/2014 | Stieger | A47J 31/007 | 99/279 |
| 8,925,441 B2 * | 1/2015 | Steiner | A47J 31/4485 | 99/293 |
| 8,931,399 B2 * | 1/2015 | Buttiker | A47J 31/461 | 99/305 |
| 8,962,053 B2 * | 2/2015 | Carbonini | A47J 31/56 | 426/511 |
| 8,991,305 B2 * | 3/2015 | Douma | A47J 31/4489 | 99/323.1 |
| 9,072,407 B2 * | 7/2015 | Castellani | C02F 1/481 | |
| 9,144,346 B2 * | 9/2015 | Deo | B67D 1/07 | |
| 9,254,059 B2 * | 2/2016 | Berto | F24H 15/174 | |
| 9,788,686 B2 * | 10/2017 | Schlee | B01F 23/291 | |
| 9,962,033 B2 * | 5/2018 | De'Longhi | A47J 31/4489 | |
| 10,413,117 B2 * | 9/2019 | Buettiker | A47J 31/4489 | |
| 10,736,460 B2 * | 8/2020 | Lin | A47J 31/465 | |
| 11,045,777 B2 * | 6/2021 | Steckling | G05D 11/132 | |
| 12,053,116 B2 * | 8/2024 | Rizzuto | A47J 31/46 | |
| 2003/0051606 A1 * | 3/2003 | Cusenza | A47J 27/18 | 99/357 |
| 2003/0066430 A1 * | 4/2003 | Bitar | A47J 31/54 | 99/275 |
| 2003/0232115 A1 * | 12/2003 | Eckenhausen | A47J 31/461 | 426/477 |
| 2004/0118291 A1 * | 6/2004 | Carhuff | A47J 31/469 | 99/275 |
| 2004/0177760 A1 * | 9/2004 | Eicher | A47J 31/56 | 99/275 |
| 2005/0172833 A1 * | 8/2005 | Ioannone | A47J 31/60 | 99/453 |
| 2006/0207432 A1 * | 9/2006 | Van Der Meer | A47J 31/52 | 99/279 |
| 2007/0031558 A1 * | 2/2007 | Lussi | A47J 31/4485 | 426/520 |
| 2008/0041235 A1 * | 2/2008 | Kramer | A47J 31/545 | 99/293 |
| 2008/0041236 A1 * | 2/2008 | Raouf | A47J 31/401 | 99/323.3 |
| 2008/0163896 A1 * | 7/2008 | Ioannone | A47J 31/4485 | 134/133 |
| 2009/0047402 A1 * | 2/2009 | Schodler | A47J 31/4489 | 99/323.1 |
| 2009/0092728 A1 * | 4/2009 | Coccia | A47J 31/4485 | 99/323.1 |
| 2009/0095163 A1 * | 4/2009 | Sala | A47J 31/469 | 99/323.3 |
| 2009/0223375 A1 * | 9/2009 | Verbeek | B67D 1/0021 | 99/287 |
| 2009/0308255 A1 * | 12/2009 | Coccia | A47J 31/465 | 99/281 |
| 2010/0018404 A1 * | 1/2010 | Villa | A47J 31/469 | 99/295 |
| 2010/0024658 A1 * | 2/2010 | Jacobs | A47J 31/469 | 99/302 R |
| 2010/0064900 A1 * | 3/2010 | Reyhanloo | F16K 11/027 | 99/300 |
| 2010/0147158 A1 * | 6/2010 | Muller | A47J 31/4485 | 99/323.1 |
| 2010/0229729 A1 * | 9/2010 | Garcia | A47J 31/60 | 700/275 |
| 2011/0179955 A1 * | 7/2011 | Marquez Gomez | C11B 3/16 | 99/501 |
| 2011/0256289 A1 * | 10/2011 | Steiner | A47J 31/4485 | 426/523 |
| 2013/0055902 A1 * | 3/2013 | Berto | F24H 15/219 | 392/397 |
| 2013/0129885 A1 * | 5/2013 | Doglioni Majer | A47J 31/5251 | 99/302 R |
| 2013/0145936 A1 * | 6/2013 | Dollner | A47J 31/4489 | 99/323.1 |
| 2013/0156913 A1 * | 6/2013 | Buttiker | A47J 31/467 | 426/433 |
| 2015/0027315 A1 * | 1/2015 | Lussi | A47J 31/42 | 99/289 R |
| 2015/0104548 A1 * | 4/2015 | Yip | A47J 31/4489 | 137/334 |

(56)      References Cited

U.S. PATENT DOCUMENTS

| | | | | |
|---|---|---|---|---|
| 2015/0208851 A1* | 7/2015 | Grassia | ................ | A47J 31/002 |
| | | | | 99/283 |
| 2015/0245736 A1* | 9/2015 | Reyhanloo | ........... | A47J 31/605 |
| | | | | 99/280 |
| 2015/0250355 A1* | 9/2015 | Reyhanloo | ........... | A47J 31/545 |
| | | | | 99/451 |
| 2016/0235244 A1* | 8/2016 | Bezzera | ................ | A47J 31/36 |
| 2016/0287007 A1* | 10/2016 | Barnett | .............. | A47J 31/5253 |
| 2018/0220837 A1* | 8/2018 | Midden | ................ | A47J 43/121 |
| 2018/0303280 A1* | 10/2018 | Locher | ................ | A47J 31/4485 |
| 2019/0069716 A1* | 3/2019 | Lin | ........................ | A47J 31/30 |
| 2019/0142211 A1* | 5/2019 | Majer | .................... | A47J 31/52 |
| | | | | 426/231 |
| 2020/0029728 A1* | 1/2020 | De'Longhi | ......... | A47J 31/4489 |
| 2020/0054163 A1* | 2/2020 | Epping | .............. | A47J 31/4496 |
| 2020/0154724 A1* | 5/2020 | Steiner | ............... | B01F 35/2211 |

FOREIGN PATENT DOCUMENTS

| | | | |
|---|---|---|---|
| EP | 0 195 750 | A2 | 9/1986 |
| EP | 2 353 472 | A1 | 8/2011 |
| EP | 3 305 144 | A1 | 4/2018 |

* cited by examiner

DEVICE FOR HEATING AND FROTHING MILK

CROSS REFERENCE TO RELATED APPLICATION

This application is a National Stage of International Application No. PCT/IB2021/058394 filed Sep. 15, 2021, claiming priority based on Italian Patent Application No. 102020000021793 filed Sep. 16, 2020.

FIELD OF THE INVENTION

The present invention relates to a device for heating and frothing milk, usable for preparing a hot beverage such as cappuccino, hot milk, and the like.

More specifically, the present invention relates to a device of the type comprising steam generating means,
a steam-driven jet pump, said jet pump comprising a steam inlet through which pressurized steam is injectable into the jet pump to generate a steam jet, as well as a first suction inlet and a second suction inlet through which respective fluids are drivable by the steam jet within the jet pump to mix with said steam jet, wherein the first suction inlet is configured to connect to a milk reservoir, and
a steam valve connected to the steam inlet of the jet pump and switchable between a first position in which the steam inlet of the jet pump is in fluid communication with the steam generating means, and a second position in which the steam inlet of the jet pump is shut off from the steam generating means.

BACKGROUND OF THE INVENTION

Devices for preparing a creamy air/milk/steam emulsion based on the principle of a steam-driven jet pump are known. In such devices, a steam jet produced by a nozzle creates, by the Venturi effect, a negative pressure in a suction chamber located downstream of the nozzle, the negative pressure drawing air and milk into the suction chamber through respective inlets connected to said chamber. Steam, milk, and air mixed in the suction chamber then flow into a subsequent chamber where an emulsion is produced.

Typically, the air channel may be opened or closed by a two-way solenoid valve or other flow interrupter system. When the air inlet is closed to produce hot milk without foam, all the suction power of the steam is used to draw in the milk. Therefore, for the same amount of steam generated, with the air closed more milk is drawn in the unit of time (higher suction speed), but with the same heating power (constant amount of steam generated). As a result, there is the drawback that, for the same amount of steam used, the hot milk will be heated less than the milk foam.

SUMMARY OF THE INVENTION

An object of the present invention is to provide a device that is able to overcome the drawback described above.

This and other objects are achieved according to the invention with a device of the type defined initially, further comprising an air inlet that is connectable or connected to the second suction inlet of the jet pump for drawing air into the jet pump, and a bypass valve connected to the second suction inlet of the jet pump and having a bypass inlet connected to the steam generating means in parallel with the steam inlet of the jet pump, said bypass valve being switchable between a first position in which the second suction inlet of the jet pump is shut off from the steam generating means, and a second position in which the second suction inlet of the jet pump is in fluid communication with the bypass inlet of the bypass valve for drawing steam into the jet pump through the second suction inlet.

The conventional airflow control system is then replaced with a system that also comprises a bypass valve that allows a portion of the steam to be sent to one of the suction inlets of the jet pump. Such a valve may be two-way or three-way, and may be a solenoid valve, an electromechanical valve or, in a less advantageous embodiment, a manually operated valve.

This valve in the first operating position allows the air to be drawn in by the Venturi effect. In the second operating position, however, the valve connects the steam supply with the suction inlet that was intended for the air. Therefore, a portion of the steam will continue to draw the milk by the Venturi effect, while another portion will be conveyed into the air channel and mixed with the milk downstream of the steam inlet of the jet pump. Appropriate restrictions on the various channels will be used to define the percentage of steam that will continue to flow into the jet pump line and the percentage of steam that will instead pass through the air valve and thus bypass the steam inlet of the jet pump.

In this configuration, the advantages are as follows:

1) the amount of steam heating the milk remains constant;
2) the amount of steam used to draw in the milk with the enabled valve decreases, thereby decreasing the suction speed of the milk, balancing the effect of increasing the speed that would instead have used the energy needed to draw in the air;
3) the air duct may also be cleaned with a steam jet in case any milk was drawn into that duct.

BRIEF DESCRIPTION OF THE FIGURES

Further features and advantages of the invention will become clear from the detailed description that follows, given purely by way of non-limiting example and with reference to the accompanying drawings, wherein.

DETAILED DESCRIPTION

Figure 1:
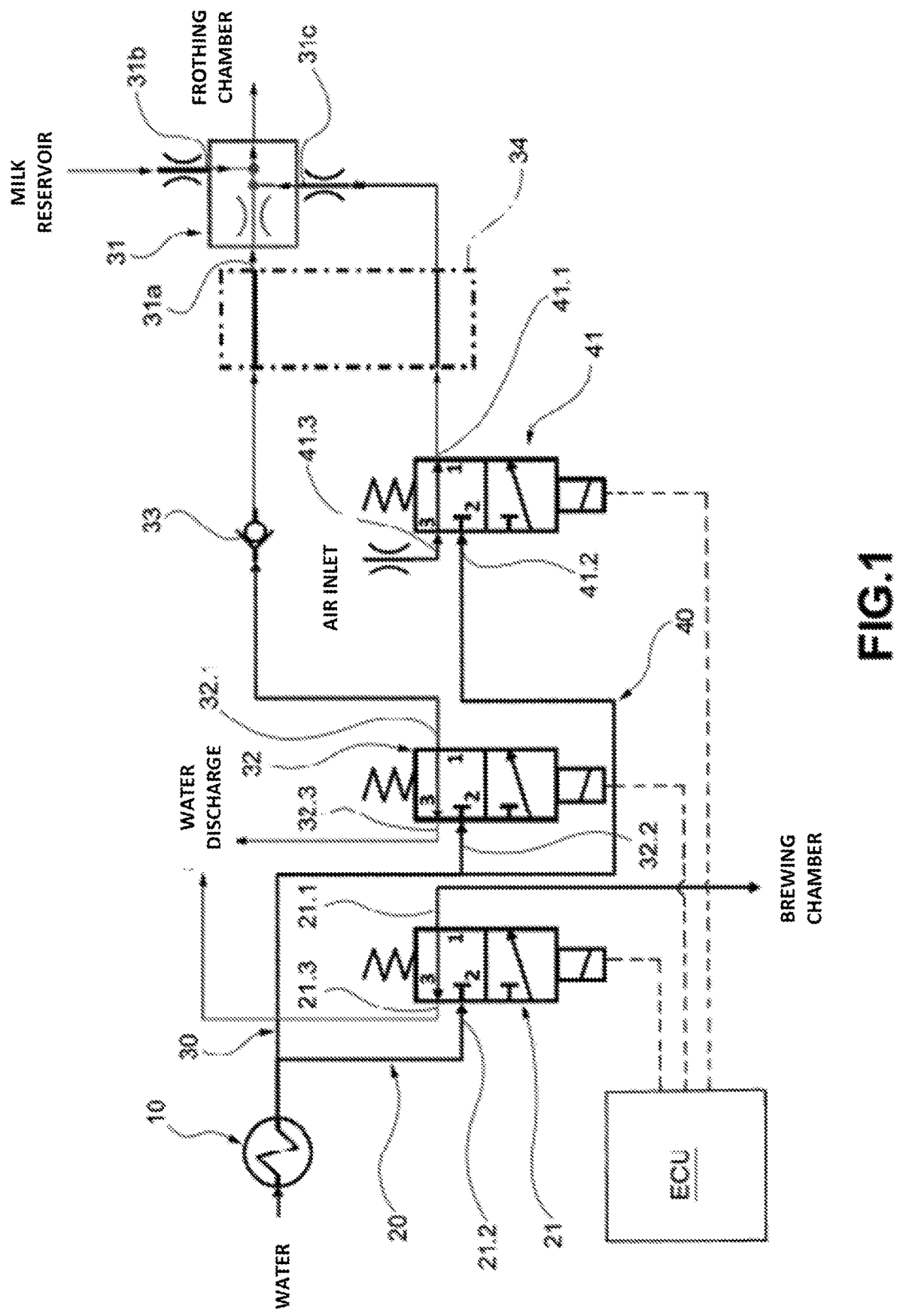
FIGS. 1 and 2 are electro-fluidic diagrams of two devices for heating and frothing milk according to the present invention.

A device according to the present invention for heating and frothing a quantity of milk contained in a reservoir is shown collectively in FIG. 1.

Such a device comprises a steam generator which, in the example shown in the drawings, is a heating device 10 fed with water in a manner known per se. For example, downstream of the heating device 10 there may be an electric pump that draws water from a reservoir. The heating device 10 is of the so-called instantaneous type, or otherwise known as a flow heater or transit heater and is used to generate the steam flow necessary for the system to operate. In general, other means for generating steam, of a type known to the person skilled in the art, may be provided.

A brewing line 20 and a milk line 30 branch off from an outlet of the heating device 10. The brewing line 20 comprises a brewing valve 21 having an inlet 21.2 connected to the heating device 10 and an outlet 21.1 connected to a brewing chamber of a type known per se, whereby a flow of steam is fed to said chamber for the preparation of a brewed beverage, such as a coffee-based beverage. The brewing valve 21 is switchable between a first position in which the brewing chamber is in fluid communication with the heating device 10, and a second position in which the brewing chamber is shut off from the heating device 10. The brewing valve 21 may further comprise an outlet 21.3 that is connected to a water discharge receptacle and that in the second position is connected to the outlet 21.1 to allow water to be discharged from the brewing chamber.

The milk line 30 comprises a steam-operated jet pump 31 of a type known per se. The jet pump 31 comprises a steam inlet 31a through which steam produced by the heating device 10 is injectable into the jet pump 31 to generate a steam jet. Downstream of the jet pump 31 a frothing chamber of a type known per se may be arranged, where the steam/milk/air mixture is conveyed to create an emulsion, and a subsequent dispensing duct.

The milk line 30 further comprises a steam valve 32 comprising an outlet 32.1 connected to the steam inlet 31a of the jet pump 31, and an inlet 32.2 connected to the outlet of the heating device 10. The steam valve 32 is switchable between a first position in which the jet pump 31 is in fluid communication with the heating device 10, and a second position in which the jet pump 31 is shut off from the heating device 10. The steam valve 32 may further comprise an outlet 32.3 connected to the water discharge receptacle and which in the second position is connected with the outlet 32.1 to allow water to be discharged from the brewing chamber.

The milk line 30 further comprises a non-return valve 33 disposed upstream of the jet pump 31 and downstream of the steam valve 32. Said non-return valve 33 is used to prevent undesirable contamination upstream thereof by the milk drawn into the jet pump 31.

The jet pump 31 then comprises a first suction inlet 31b and a second suction inlet 31c through which respective fluids are drivable by the steam jet within the jet pump 31 to mix with the steam jet. The first suction inlet 31b is connected to a milk reservoir.

An area 34 enclosed by a line of dashes and dots is depicted upstream of the jet pump 31. This area represents an interface between the body of the machine for preparing brewed beverages, to the left of the area 34, and an accessory mountable on the body of the machine, to the right of the area 34. This accessory houses the jet pump with the subsequent components, such as the frothing chamber and the dispensing duct for dispensing hot milk and/or milk foam.

The device described above further comprises a bypass line 40, which in the embodiment of FIG. 1 branches from the milk line 30 upstream of the steam valve 32.

The bypass line 40 comprises a bypass valve 41 having an outlet 41.1 connected to the second suction inlet 31c of the jet pump 31. The bypass valve 41 further comprises an air inlet 41.3 for the air to enter and a bypass inlet 41.2 for the steam to enter. In the embodiment of FIG. 1, the bypass inlet 41.2 of the bypass valve 41 is connected to the heating device 10, upstream of the steam valve 32. The bypass valve is switchable between a first position in which the second suction inlet 31c of the jet pump 31 is in fluid communication with the air inlet 41.3 of the bypass valve 41 for drawing air into the jet pump 31, and a second position in which the second suction inlet 31c of the jet pump 31 is in fluid communication with the bypass inlet 41.2 of the bypass valve 41 for drawing steam into the jet pump 31.

The bypass line 40 may further comprise a non-return valve (not shown) arranged upstream of the second suction inlet 31c. This non-return valve serves to prevent undesirable contamination upstream thereof by milk drawn into the jet pump 31.

The device described above further comprises an electronic control unit ECU operatively connected to the heating device 10, the brewing valve 21, the steam valve 32, and the bypass valve 41.

The electronic control unit ECU is configured to control and coordinate the aforesaid components in a predetermined manner according to instruction signals provided to the control unit ECU.

The operation of the device described above for dispensing milk foam or hot milk shall now be described. In the following description, it is assumed that the steam valve 32 is always in its first position, whereby the steam flow generated by the heating device 10 and sent to the milk line 30 may be used to prepare milk foam or hot milk. Said steam is fed to the jet pump 31 through the milk line 30, the steam valve 32, the non-return valve 33, and the steam inlet 31a of the jet pump 31.

If a command for dispensing milk foam is supplied to the electronic control unit, the bypass valve 41 is in its first position or is switched thereto. In that first position, the bypass valve 41 allows air to be drawn into the jet pump 31 by the Venturi effect, through the air inlet 41.3 of the bypass valve 41 and the second suction inlet 31c of the jet pump 31. In the jet pump 31, the driving fluid composed of the steam entering from the steam inlet 31a mixes with the milk and air respectively drawn from the first suction inlet 31b and the second suction inlet 31c. The steam/milk/air mixture is then conveyed into the frothing chamber and the subsequent dispensing duct for dispensing the milk foam.

If a command for dispensing hot milk without foam or with a smaller amount of foam is provided to the electronic control unit, the bypass valve 41 is in its second position or is switched thereto. In said second position, the jet pump 31 is shut off from the air inlet, and the bypass valve 41 instead connects the heating device 10 with the second suction inlet 31c, via the bypass line 40 and the bypass valve 41. Thus, a portion of the steam generated by the heating device 10 is used as a driving fluid through the steam inlet 31a of the jet pump 31 to draw in milk by the Venturi effect from the first suction inlet 31b, while another portion of the steam generated by the heating device 10 is drawn in through the second suction inlet 31c and mixed with the milk downstream of the steam inlet 31a of the jet pump 31. The steam/milk mixture is then conveyed into the frothing chamber and into the subsequent dispensing duct for dispensing hot milk. Said hot milk is essentially devoid of the fine, firm foam that would have been produced by the incorporation of air into the milk through the jet pump and subsequent frothing chamber.

By virtue of the device described above, the amount of steam heating the milk remains constant for frothing milk and for preparing hot milk. In addition, the amount of steam used to draw the milk with the bypass valve in the second position is less than that used to draw the milk with the bypass valve in the first position, thereby decreasing the milk suction speed that balances the effect of increasing the speed that would have instead occurred using all the energy provided by the steam as the driving fluid of the jet pump.

Advantageously, it is also possible to steam clean the channel connecting the outlet of the bypass valve to the second suction inlet 31c of the jet pump 31 in case milk has been drawn into that channel.

According to a variant, it may be provided that the device described above is also capable of producing milk foam together with milk according to various proportions depending on recipes provided to the control unit. Assuming that the actuation time of the jet pump 31 is equal to $\Delta T$, the control unit ECU may adjust the dwell time $\Delta T1$ in which the bypass valve 41 remains in the first position, and thus allows milk foam to be dispensed, and the dwell time $\Delta T2$ in which the bypass valve 41, after switching, remains in the second position, where $\Delta T=\Delta T1+\Delta T2$. Dispensing only milk foam corresponds to $\Delta T2=0$, and therefore $\Delta T=\Delta T1$, while dispensing only hot milk corresponds to $\Delta T1=0$, and therefore $\Delta T=\Delta T2$.

Figure 2:
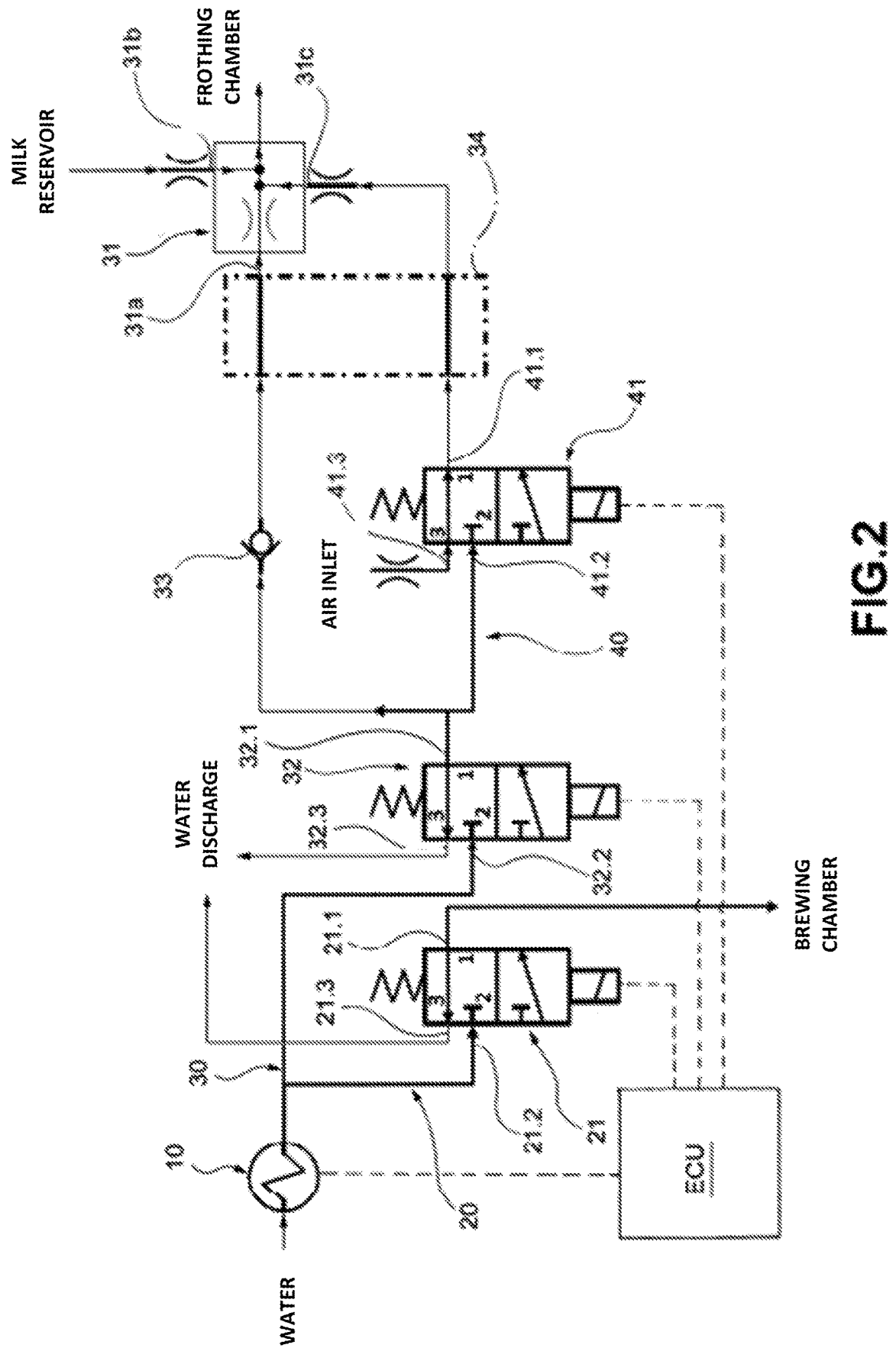

A second embodiment of the invention is illustrated in FIG. 2, in which the bypass line 40 branches from the milk line downstream of the steam valve 32. Thus, the second inlet 41.2 of the bypass valve 41 and the steam inlet 31a of the jet pump 31 are both connected to the outlet 32.1 of the steam valve 32.

Otherwise, the components and operation are identical to those of the previous embodiment, and therefore will not be further described.

Figure 3:
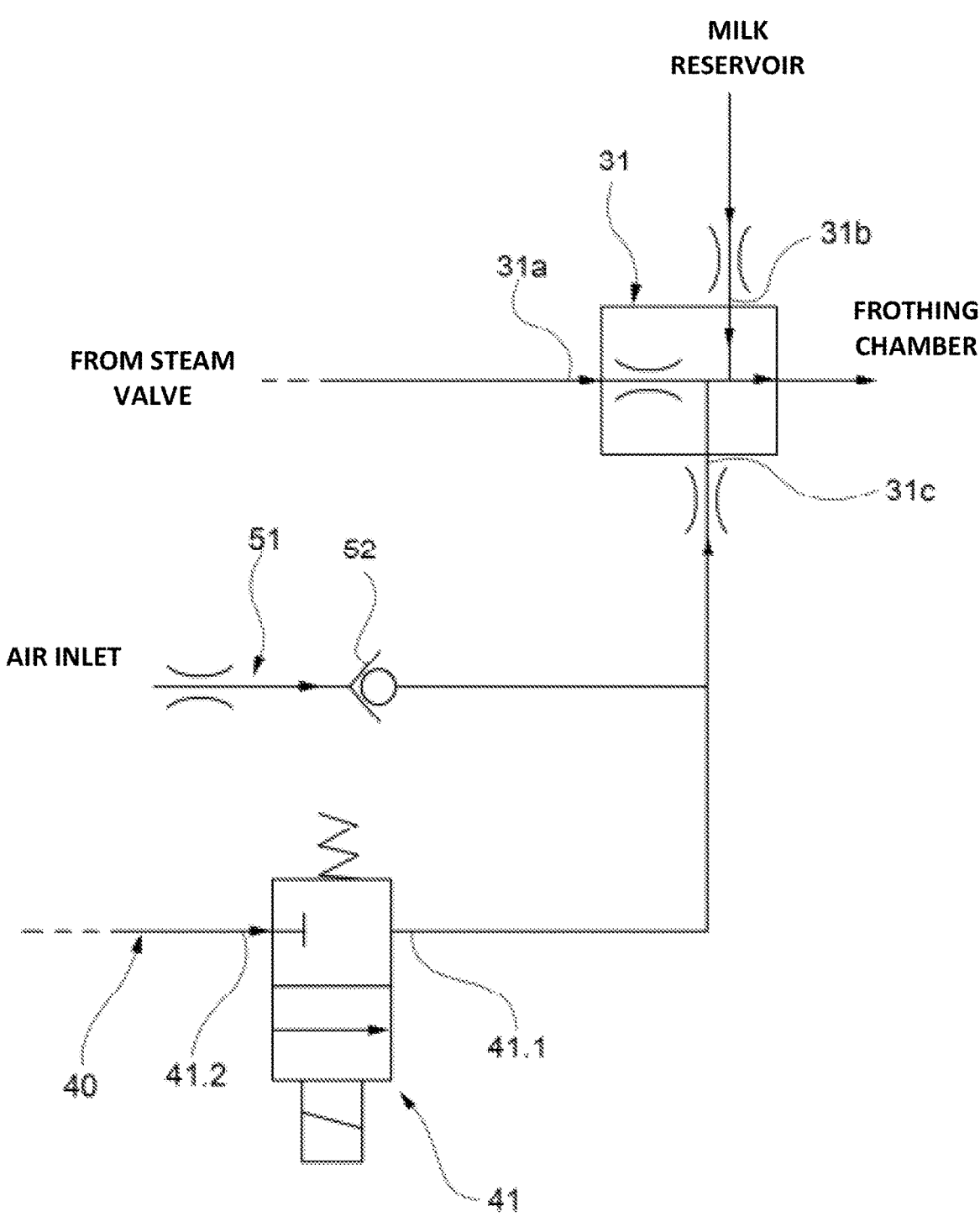
FIG. 3 is a diagram of a variant applicable to both devices in FIGS. 1 and 2.

FIG. 3 illustrates a further variant of the invention, in which the air inlet, now designated 51, is no longer incorporated into the bypass valve 41, but is also connected to the second suction inlet 31c of the jet pump 31 separately from the bypass valve 41. The bypass valve 41 is now a two-way valve, having an outlet 41.1 connected to the second suction inlet 31c of the jet pump 31, and a bypass inlet 41.2 for the steam to enter. The bypass valve 41 is switchable between a first position in which the second suction inlet 31c of the jet pump 31 is shut off from the steam generator 10, and a second position in which the second suction inlet 31c of the jet pump 31 is in fluid communication with the bypass inlet 41.2 of the bypass valve 41 for drawing steam into the jet pump 31 through the second suction inlet 31c.

In the variant of FIG. 3, the air inlet 51 is permanently connected to the second suction inlet 31c, regardless of whether the bypass valve 41 is in its first or second position. The duct connecting the air inlet 51 to the second suction inlet 31c will therefore need to be provided with a suitably calibrated restriction whereby, when the bypass valve 41 is in the second position, the flow of air drawn through the air inlet 51 is negligible compared to the flow of steam drawn through the bypass valve 41.

The air inlet duct 51 further comprises a non-return valve 52 arranged upstream of the confluence with the bypass line 40. This non-return valve 52 serves to prevent steam from escaping through the air inlet 51.

Otherwise, the components and operation are identical to either of the preceding embodiments, and therefore will not be further described or depicted in the figures.

Naturally, without prejudice to the principle of the invention, the embodiments and the details of construction may vary widely with respect to that which has been described and illustrated purely by way of non-limiting example, without thereby departing from the scope of the invention as defined in the appended claims.

The invention claimed is:

1. A device for heating and frothing milk, usable for preparing a hot beverage, comprising
a steam generator, a jet pump operated by steam, said jet pump comprising a steam inlet through which pressurized steam is injectable into the jet pump to generate a steam jet, a first suction inlet and a second suction inlet through which respective fluids are drivable by the steam jet into the jet pump to mix with said steam jet, wherein the first suction inlet is configured to connect to a milk reservoir, and
a steam valve connected to the steam inlet of the jet pump and switchable between a first position in which the steam inlet of the jet pump is in fluid communication with the steam generator, and a second position in which the steam inlet of the jet pump is shut off from the steam generator,
said device further comprising
an air inlet connectable or connected to the second suction inlet of the jet pump for suction of air into the jet pump, and
a bypass valve connected to the second suction inlet of the jet pump and having a bypass inlet connected to the steam generator in parallel with the steam inlet of the jet pump, said bypass valve being switchable between a first position in which the second suction inlet of the jet pump is shut off from the steam generator, and a second position in which the second suction inlet of the jet pump is in fluid communication with the bypass inlet of the bypass valve for suction of steam into the jet pump through the second suction inlet.

2. The device of claim 1, wherein the air inlet is incorporated into the bypass valve, wherein in the first position of the bypass valve the second suction inlet of the jet pump is in fluid communication with the air inlet for drawing air into the jet pump, and wherein in the second position of the bypass valve the second suction inlet of the jet pump is shut off from the air inlet.

3. The device of claim 1, wherein the air inlet and the bypass valve are connected to the second suction inlet of the jet pump separately from each other.

4. The device of claim 1, wherein an inlet of the steam valve is connected to the steam generator.

5. The device of claim 1, wherein the bypass inlet of the bypass valve and the steam inlet of the jet pump are both connected to an outlet of the steam valve.

6. The device of claim 1, wherein the steam inlet of the jet pump is connected to an outlet of the steam valve and the bypass inlet of the bypass valve is connected to the steam generator, upstream of the steam valve.

7. The device of claim 1, further comprising a brewing valve having an inlet connected to the steam generator and an outlet connected to a brewing chamber for preparing a brewed beverage, said brewing valve being switchable between a first position in which the brewing chamber is in fluid communication with the steam generator, and a second position in which the brewing chamber is shut off from the steam generator.

8. The device of claim 1, further comprising an electronic control unit (ECU) configured to control and coordinate, according to predetermined procedures, the steam valve and the bypass valve as a function of instruction signals provided to the ECU.

9. The device of claim 8, wherein the ECU is configured to adjust a dwell time $\Delta T1$ of the bypass valve in the first position and a dwell time $\Delta T2$ of the bypass valve in the second position as a function of a recipe provided to the ECU.

10. The device of claim 1, wherein the hot beverage is cappuccino or hot milk.

\* \* \* \* \*